United States Patent [19]

Ohara

[11] Patent Number: 4,557,445
[45] Date of Patent: Dec. 10, 1985

[54] AUTO DEVICE MOUNTING STRUCTURE
[75] Inventor: Seishichi Ohara, Tokyo, Japan
[73] Assignee: Clarion Co., Ltd., Tokyo, Japan
[21] Appl. No.: 602,588
[22] Filed: Apr. 20, 1984
[30] Foreign Application Priority Data Sep. 14, 1983 [JP] Japan .................................. 58-141419

[51] Int. Cl.$^4$ .............................................. G12B 9/00
[52] U.S. Cl. .................................. 248/27.1; 248/205.1
[58] Field of Search .................. 248/27.1, 27.3, 205.1, 248/906; 312/242, 245; 339/126 R; 70/58; 220/3.5, 3.6

[56] References Cited

U.S. PATENT DOCUMENTS 2,137,035 11/1938 Swallow ......................... 248/27.1 X
2,184,694 12/1939 Cohen ............................ 248/27.1 X
2,506,181 5/1950 Thibault ......................... 248/27.1 X
3,799,483 3/1974 Chiappinelli ...................... 248/27.3
3,960,349 6/1976 Schierholz ....................... 312/242 X Primary Examiner—J. Franklin Foss
Attorney, Agent, or Firm—Flynn, Thiel, Boutell & Tanis

[57] ABSTRACT

The auto device mounting structure comprises bracket means consisting of a sleeve-shaped bracket member which defines a recess to receive an auto device inserted from the front end and a rear frame which defines a substantially opened extension of said recess terminating at an end plate. The end plate is provided with a projection extending rearward to engage a fixed member immovable with respect to a car so as to keep the rear frame from fluctuation or rotation due to vibration of the car.

4 Claims, 3 Drawing Figures

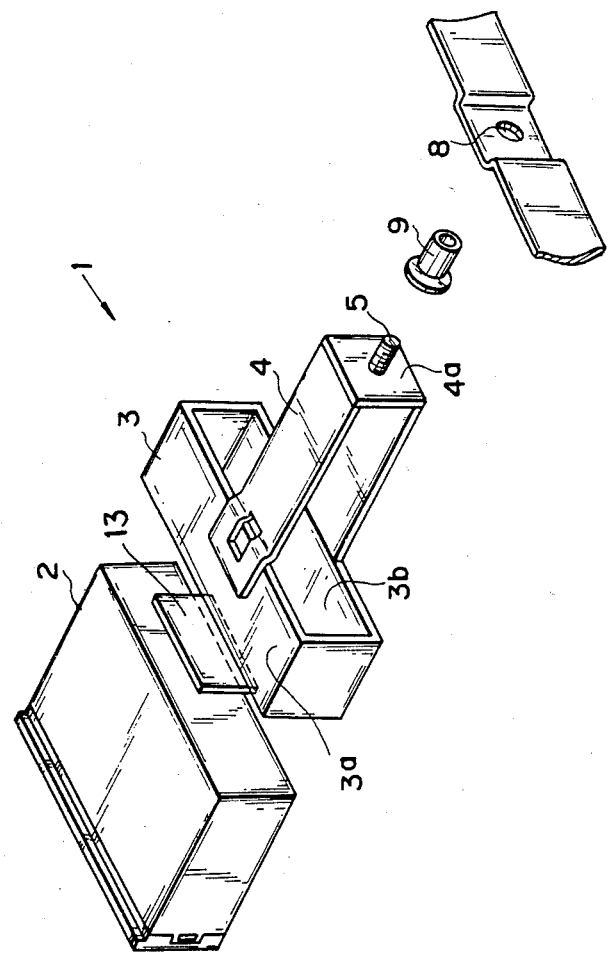

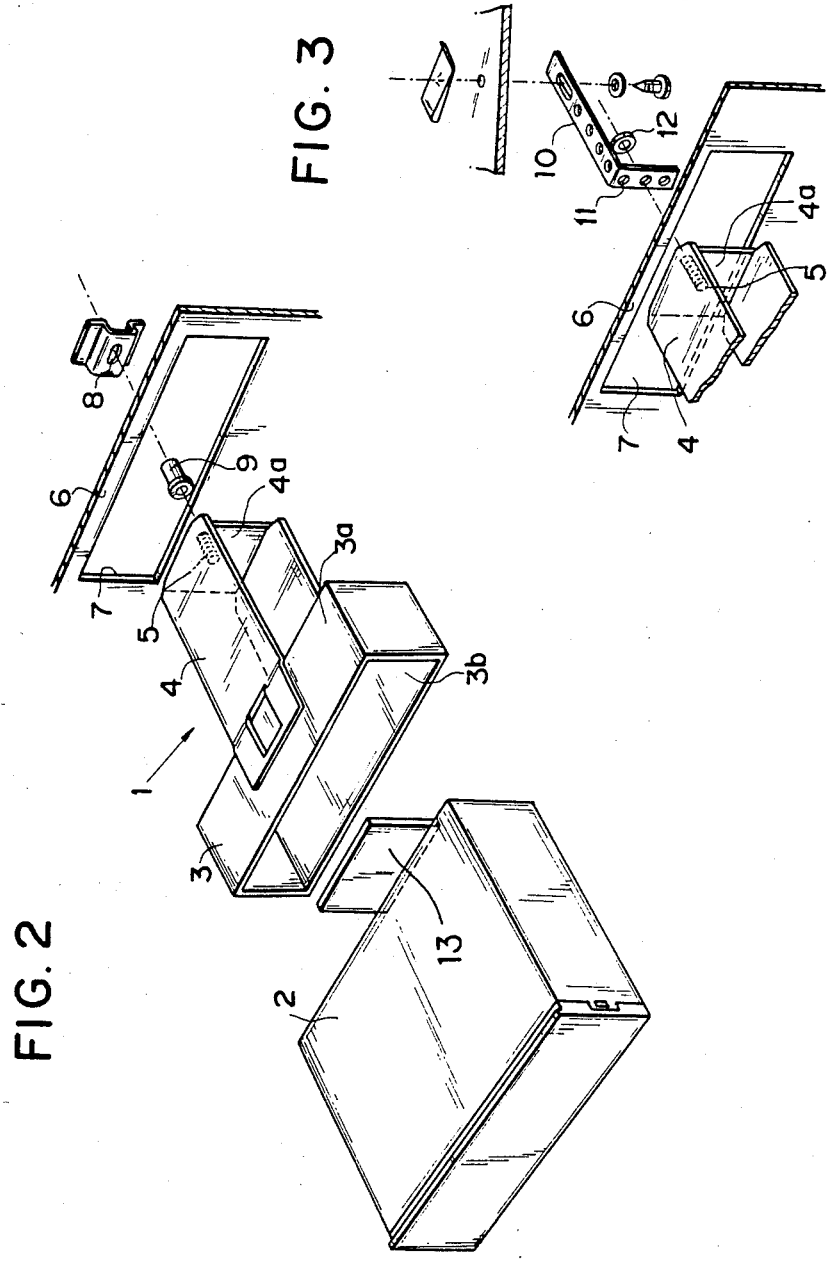

AUTO DEVICE MOUNTING STRUCTURE

FIELD OF THE INVENTION

This invention relates to a mounting structure to mount an auto device such as auto radio, auto stereo or the like in position in a car.

BACKGROUND OF THE INVENTION

One prior art auto device mounting structure comprises a sleeve-shaped bracket which is adapted to be affixed to an instrument panel or mount board of a car so as to define a recess behind an aperture of the instrument panel to receive therein an auto device such as auto radio, auto stereo, etc. which is inserted from the front side of the instrument panel. If the bracket is too short in the axial direction thereof with respect to the back and forth length of the auto device, it cannot prevent the rear half of the auto device therein fluctuating or rotating along with movement of the car, even if the bracket itself is reliably fixed to the instrument panel.

In this connection, the prior art mounting structure provides the back face of the auto device itself with a projection or a bolt to engage some adequate fixed member immovable with respect to the car.

By this fixture method, however, since the projection or bolt as well as the fixed member of the car is hidden behind the auto device upon its placement, an operator cannot readily fit the projection to the fixed member, nor tighten the bolt.

OBJECT OF THE INVENTION

It is therefore an object of the invention to provide an auto device mounting structure which can reliably prevent up and down fluctuation or movement of a rear half of an auto device mounted in position a car, and also makes it easier for an operator to complete the mounting operation.

SUMMARY OF THE INVENTION

The mounting structure according to the invention employs bracket means comprising a sleeve-shaped bracket member and a rear frame. The rear frame consists of two parallel plates coplanarly and rearwardly extending from opposed plates of the bracket member and united together by an end plate. The end plate has a projection rearwardly extending therefrom so that the projection be secured to a fixed member immovable with respect to a car before an auto device is inserted into the bracket means, thereby facilitating estimation of the proper placement of the projection and completion of the mounting operation.

The invention will be better understood from the description hereinbelow given by way of preferred embodiments illustrated.

BRIEF DESCRIPTION OF THE DRAWINGS

FIG. 1 is a perspective view of bracket means embodying the invention as viewed from the rear end thereof;

FIG. 2 is a perspective view illustrating how to mount an auto device to an instrument panel; and FIG. 3 is a partial perspective view of a modified embodiment of the invention.

DETAILED DESCRIPTION OF THE PREFERRED EMBODIMENT

Bracket means generally designated by reference numeral 1 comprises a sleeve-shaped bracket member 3 and a rear frame member 4. The rear frame member 4 consists of top and bottom parallel plates connected to and coplanarly, backwardly extending from opposed plates 3a and 3b of the bracket member 3, respectively, and an end plate 4a uniting the two parallel plates at the rear ends thereof. The end plate 4a carries a bolt-shaped engagement projection 5 which projects rearwardly. An instrument panel 6 (FIG. 2) secured to a car (not shown) has formed an aperture 7 through which the bracket means 1 is inserted to define a recess behind it. Behind and spaced from the instrument panel 6, a fixed hole 8 is provided in some component immovable with respect to a car to fixedly engage the projection 5. Reference numeral 2 denotes an auto device to be mounted in the car by the mounting structure.

To actually fix the auto device 2 in position, the bracket means 1 is first inserted through the aperture of the instrument panel 6, with the front end of the bracket member 3 secured to the instrument panel 6 behind the aperture 7, and with the projection 5 of the end plate 4a inserted in the fixed hole 8. In this case, the projection 5 may be capped by a rubber cap 9 to yieldably engage the fixed hole 8.

If the car does not have the hole 8, a separate part 10 with holes 11 as shown in FIG. 3 is secured in position of a car to receive the projection 5 in the hole 11. A nut 12 may be applied to the projection 5 behind the hole 11 to improve the fixture of the projection 5.

After this, the auto device 2 provided with a cushion member 13 at the back face thereof is inserted into the bracket means 1 through the aperture 7, up to a position whereat the cushioned back face contacts the end plate 4a of the rear frame 4. Thus, the bracket member 3 fixes the auto device 2 in the back and forth direction as well as in the up and down direction as in the prior art, and the rear frame 5 prevents the rear half of the auto device 2 from fluctuation or rotation due to vibrations of the car.

EFFECTS OF THE INVENTION

As described above, the auto device mounting structure according to the invention supports a rear half of an auto device by the rear frame which has the projection immovably fixed to a car. Since the fixture of the projection to a car is done before such an auto device is inserted in the bracket means, and the rear half of the bracket means is substantially open except the relatively narrow rear frame, an operator can see the aspect behind the instrument panel and can readily estimate the positions of the projection and of the fixed hole. Thus, the invention greatly facilitates the mounting operation, and fully overcomes the problems in the prior art such that an auto device itself disturbs an operator in estimating the positions of the projections and of the fixed hole, or in completing the fixing operation.

The embodiments of the invention in which an exclusive property or privilege is claimed are defined as follows:

1. An auto device mounting structure for mounting an auto device in an aperture in a panel of a car, which structure comprises:

a sleeve-shaped bracket member receiving therein the auto device inserted from the front end thereof;

a rear frame consisting of two parallel plates coplanarly, rearwardly extending from opposed plates of said bracket member, and a rear end plate uniting said parallel plates together;

a projection rearwardly projecting from said rear end plate; and a separate part secured to a fixed position of the car spaced behind said panel and having at least one hole receiving said projection therethrough, said projection being threaded along the outer circumference thereof and fixed to said separate part by a nut applied thereto behind said hole.

2. An auto device mounting structure of claim 1 further comprising a rubber cap applied to said projection.

3. An auto device mounting structure for mounting an auto device of generally rectangular cross-sectional shape in an aperture in a panel of a car, which structure comprises:

a rectangular sleeve-shaped bracket member receiving therein the auto device inserted from the front end of said sleeve-shaped bracket member, said sleeve-shaped bracket member having a rearward extent substantially less than that of said auto device so that said auto device projects rearward substantially beyond the rear edge of said sleeve-shaped bracket member;

a rear frame consisting of a top plate and a parallel bottom plate coplanarly, rearwardly extending from opposed top and bottom walls of said sleeve-shaped bracket member, and a rear end plate upstanding from said bottom plate and connecting same to said top plate at the rear ends of said top and bottom plates, the sideways width of said rear frame top and bottom plates and rear end plate being only a small fraction of the sideways width of said top and bottom walls of said sleeve-shaped bracket member, such that said bracket member and rear frame are of T-shape as seen from the top thereof; and a projection rearwardly projecting from said rear end plate so as to be fixed to a fixed member spaced behind said panel in the car, said rear frame being entirely open sidewardly and mostly open to the top and bottom and rear so an installer looking rearward through the sleeve-shaped bracket member can see a hole in said fixed member while aligning and inserting the projection into the hole; and a flat padlike cushion member sandwiched between the rear wall of said auto device and said rear frame rear end plate opposite said projection.

4. An auto device mounting structure of claim 3 wherein said fixed member is a separate part secured to a fixed position of the car and having at least one hole to receive said projection therethrough, said projection being threaded along the outer circumference thereof so as to be fixed by a nut applied thereto behind said hole.

* * * * *